(12) United States Patent
Germann et al.

(10) Patent No.: US 11,089,802 B2
(45) Date of Patent: Aug. 17, 2021

(54) COLOR-ENHANCED COMPOSITIONS (71) Applicant: CARGILL, INCORPORATED, Wayzata, MN (US)

(72) Inventors: Daniel Germann, Munich (DE); Brian Guthrie, Chanhassen, MN (US); Thomas Hofmann, Munich (DE); Timo Stark, Munich (DE)

(73) Assignee: CARGILL, INCORPORATED, Wayzata, MN (US)

( * ) Notice: Subject to any disclaimer, the term of this patent is extended or adjusted under 35 U.S.C. 154(b) by 0 days.

(21) Appl. No.: 16/641,418

(22) PCT Filed: Aug. 23, 2018

(86) PCT No.: PCT/US2018/047740
§ 371 (c)(1),
(2) Date: Feb. 24, 2020

(87) PCT Pub. No.: WO2019/040739
PCT Pub. Date: Feb. 28, 2019

(65) Prior Publication Data
US 2020/0236978 A1 Jul. 30, 2020

(30) Foreign Application Priority Data
Aug. 24, 2017 (EP) .................................... 17187708

(51) Int. Cl.
*A23L 5/47* (2016.01)
*A23L 2/58* (2006.01)
*A23G 1/00* (2006.01)

(52) U.S. Cl.
CPC ........ *A23L 5/47* (2016.08); *A23L 2/58* (2013.01); *A23G 1/0006* (2013.01)

(58) Field of Classification Search
CPC ............ A23L 5/47; A23L 2/58; A23G 1/0006
(Continued)

(56) References Cited

U.S. PATENT DOCUMENTS 2,380,158 A   7/1945   Konrad
4,435,436 A   3/1984   Terink
(Continued)

FOREIGN PATENT DOCUMENTS

GB   2182538 B   12/1989
GB   2414393 A   * 11/2005   ........... A23G 1/0006
(Continued)

*Primary Examiner* — Brent T O'Hern (57) ABSTRACT

The present invention relates to a method of producing compositions with enhanced color properties and to compositions obtainable by such a method, especially cocoa-based compositions with enhanced color properties. The method comprises the steps of providing an initial composition comprising a polyphenol, adding an aqueous base to the initial composition to produce an aqueous mixture, heating the aqueous mixture to a temperature of 50 to 100° C. during a time period of 120 to 300 minutes, cooling the aqueous mixture, and optionally adjusting the pH of the aqueous mixture to between 6 and 9. The method further comprises oxygenising the aqueous base and/or the aqueous mixture, wherein the produced food product comprises chromophores having an absorption maximum between 505 to 515 nm and/or 428 to 438 nm.

19 Claims, 5 Drawing Sheets

(58) Field of Classification Search
USPC ............................................................ 426/268
See application file for complete search history.

(56) References Cited

U.S. PATENT DOCUMENTS

| | | | |
|---|---|---|---|
| 4,532,147 A | | 7/1985 | Jonas |
| 4,784,866 A | * | 11/1988 | Wissgott .................. A23G 1/02 |
| | | | 426/262 |

FOREIGN PATENT DOCUMENTS

| | | | | |
|---|---|---|---|---|
| WO | 2008043058 A1 | | 4/2008 | |
| WO | WO-2008043058 A1 | * | 4/2008 | ............. A23L 5/276 |
| WO | 2016013522 A1 | | 1/2016 | |

* cited by examiner

COLOR-ENHANCED COMPOSITIONS

CROSS-REFERENCE TO RELATED APPLICATIONS

This application is a national phase application of International Application No. PCT/US2018/047740, filed Aug. 23, 2018, which claims the benefit of European Patent Application No. 17187708.7, filed Aug. 24, 2017, each of which is hereby incorporated by reference in its entirety.

The present invention relates to a method of producing compositions with enhanced color properties and to compositions obtainable by such a method, especially cocoa-based compositions with enhanced color properties.

BACKGROUND

In the food industry, and in particular in applications such as confectionery, bakery, frozen desserts and beverages, colour is very important, with consumers associating certain colours with a certain taste and/or product quality of the product.

The colour of a composition can be changed by adding colouring agents to the composition or by modifying existing ingredients of the composition to enhance their colour.

One common example of a modification of a food ingredient is the alkalization of cocoa powder, in which natural cocoa powder is treated with an alkaline solution for 30 to 60 min at 75 to 90° C., depending on which colour is desired i.e. red, dark red or black. The alkalization process is advantageous as no artificial colours are needed to add both flavour and visual properties to the cocoa powder or to food products in which it is used.

Even though the alkalization process has been known for many decades, technological advances in controlling colour development and in promoting the formation of specific chromophores responsible for desirable colour changes has been very limited.

Hence, it remains a challenge to provide food ingredients with unique colour properties, especially an increased reddish colour. Furthermore, it remains a challenge to increase the formation of chromophores, especially red and yellow chromophores, in food compositions.

SUMMARY OF INVENTION

With this background, it is an object of the present invention to provide solutions that meet one or more of the needs described above, i.e. controlling, modifying or enhancing the color of a food product or composition, and/or increasing the formation and/or potency of chromophores in a food product or composition. Furthermore, it is an object of the invention to provide a food product or composition, especially a cocoa powder, with a distinct red or yellow color.

This object is solved in a first aspect of the invention directed at a method of producing a food product, comprising the steps of
a) providing an initial composition comprising a polyphenol;
b) adding an aqueous base to the initial composition to produce an aqueous mixture;
c) heating said aqueous mixture to a temperature of 50 to 100° C. during a time period of 120 to 300 minutes;
d) cooling the aqueous mixture; and
e) adjusting the pH of said aqueous mixture to 7-9

It has surprisingly been shown that the method according to the invention results in a food product having unique color properties and a unique composition of chromophores despite using mild processing conditions. An increase in the number of potent chromophores is believed to be especially important for the appearance of the final food product.

Hence, with the present invention, the control of the color of a food product has been greatly improved using mild processing conditions rendering the process more economical and environmentally friendly.

The Initial Composition

It is believed that the improved coloring of the food product is controlled by the formation of so-called potent chromophores. These are formed through the oxidation of polyphenols present in the initial composition. Oxidation reactions involving flavonoids, preferably flavan-3-ols such as catechin and/or epicatechin, in an alkaline medium are believed to be particularly important.

Thus, the initial composition comprises at least one polyphenol. The polyphenol is preferably a flavonoid or a flavonoid polymer, more preferably a flavan-3-ol or a polymer of flavan-3-ol such as procyanadin. More preferably, the polyphenol is selected from one or more of (−)-epicatechin, (+)-epicatechin, (+)-catechin, (−)-catechin, and a polymer of one or more thereof.

Generally, polyphenols may be present in the skin, seeds, and/or pulp of a fruit, berry, bean, or nut. Advantageously the polyphenol content of the initial composition is relatively high (see phenol-explorer.eu for typical values). Cocoa beans, green tea, malt, peaches, grapefruit, argan kernels, acai berries, black grapes, blackberries, pomes fruit, cherries, raspberries, broad beans, prunes, and coffee beans are all known to be relatively rich in polyphenols. As such, although the initial composition can be produced from any polyphenol-containing raw material, it will preferably be produced from any one or more of cocoa beans, green tea, malt, peaches, grapefruit, argan kernels, acai berries, black grapes, blackberries, pomes fruit, cherries, raspberries, broad beans, prunes, and coffee beans. Most preferably, it will be produced from cocoa beans (e.g. cocoa powder, cocoa liquor or cocoa cake).

The initial composition may be in any suitable form, prepared for example by grinding to produce a powder (such as cocoa powder or ground coffee beans), or a purée (such as a fruit purée), or by pressing to extract a juice (e.g. a fruit juice) or an oil (e.g. argan oil). Advantageously, the initial composition may be in the form of a dispersion or solution.

Preferably, the initial composition will be in the form of a polyphenol-rich extract, more preferably a polyphenol-rich extract from any of the above plant-based compositions, more preferably a polyphenol-rich extract from cocoa. It is indeed believed that the formation of the desired potent chromophores may be increased by increasing the concentration of polyphenols present in the initial composition. Polyphenol extraction may achieved by any means known in the art. Advantageously, it will be achieved through solvent extraction, including, for example, by means of a soxleth extractor.

The Aqueous Base

According to the method of the present invention, the initial composition is added to (or mixed with) an aqueous base. Without wishing to be bound by theory, it is believed that an alkaline environment favours the stable formation of chromophores, especially red and yellow chromophores (that is chromophores having an absorption maximum between 505 to 515 nm, and 428 to 438 nm, respectively).

The base is preferably selected from the group consisting of: potassium hydroxide, potassium carbonate (potash), magnesium hydroxide, magnesium carbonate, ammonium hydroxide, ammonium bicarbonate and mixtures of two or more thereof. Ideally, the alkalizing agent used in the method of the present invention will be potash.

Surprisingly, it was found that only a small amount of base was needed. Advantageously, the amount of base added is between 0.1 wt-% and 2 wt-%, preferably between 0.2 wt-% and 1.5% wt-%, more preferably about 1 wt-% based on the total weight of the aqueous mixture.

The aqueous base (that is a solution of the selected base in water) will preferably have a pH in the range of 10 to 12, preferably 11.

The Heating Step

According to the method of the present invention, the aqueous mixture of aqueous base and initial composition are heated to a temperature of between 50 and 100° C. during a time period of 120 to 300 minutes. Preferably, the aqueous mixture is heated to 50-90° C., more preferably 50-80° C., more preferably 50-70° C., more preferably 50-60° C., for 120-300 minutes, preferably for 150 to 250 minutes, more preferably for 170 to 200 minutes.

Advantageously, the heating step will be performed under pressure. For example, it may be performed at a pressure of up to 12 bars. Preferably, it will be performed at a pressure of 5-10 bars, more preferably at a pressure of 5-7 bars, more preferably at a pressure of about 6 bars.

Oxygenation

Without wishing to be bound by theory, it is believed that the desired red and yellow chromophores are generated from polyphenols upon condensation reactions between their precursers and Maillard-reaction carbohydrate fragmentation products such as methylgloxal. It is currently believed that an oxidation reaction in alkaline conditions is an intermediate step in the formation pathway of red and yellow chromophores. Advantageously, therefore, the heating step is performed in an oxygen-rich atmosphere such as air, oxygen-enriched air, ozone, or pure oxygen.

The method may also comprise an oxygenation step comprising the oxygenation of the aqueous base and/or aqueous mixture. Oxygenation may be achieved by any method known in the art including, for example, by passing an oxygen stream into the aqueous base and/or the aqueous mixture; and/or by adding an oxidizing agent to the aqueous base and/or aqueous mixture. When using an oxygen stream, it will preferably be passed into the aqueous base and/or mixture for a duration of approximately 1 min to 1 hour, preferably 5 min to 30 minutes, more preferably 5 to 10 minutes.

The oxidizing agent may be selected from any known oxidizing agents, such as hydrogen peroxide, ozone, and suitable metals (such as Fe, Cu or Mn at different oxidation states). Preferably the oxidizing agent will hydrogen peroxide. The inventors have shown that by adding small amounts of hydrogen peroxide to the aqueous mixture, the food product obtains a distinct red colour. Thus, the amount of hydrogen peroxide added to the aqueous base and/or aqueous composition is preferably in the range of 0.1 to 1 vol-% based on the total volume of the aqueous base and/or aqueous mixture.

Advantageously, oxygenation will be achieved by both passing an oxygen stream into the aqueous base and/or aqueous mixture, and by adding an oxidizing agent to the aqueous base and/or aqueous mixture. Preferably the oxidizing agent is added before or simultaneously with passing the oxygen stream into the aqueous base and/or aqueous mixture.

The Cooling Step

After completion of the heating step, the resulting composition is cooled, preferably to a temperature of 15 to 30° C., more preferably to 20-25° C. The composition may be actively cooled through refrigeration or in a cooling tunnel or it may simply be allowed to cool at ambient temperature.

Adjusting the pH

After cooling, the pH of the composition is preferably adjusted to a pH of 6-9, preferably to a pH of about 7. The pH may be adjusted using any known means, for example by addition of an acid such as formic acid.

Drying and/or Roasting

The resulting food product may be used as such. Alternatively, before use, one or more additional processing steps may be performed. These may include, for example, drying, roasting, and/or sterilization, each of which may be performed simultaneously or sequentially with each other.

Sterilization will preferably be achieved by heating the composition, with steam, hot air, or through contact heating for example, to about 100° C. (i.e. to 95-105° C.) for up to one hour, preferably for 20 to 30 minutes. Preferably, the composition will be heated for essentially only enough time, and at as low a temperature as possible in order to sterilize it sufficiently for further processing, that is to meet minimal manufacturing standards for sterility.

Drying may be achieve using any known means, including spray drying or freeze drying. Drying will preferably reduce the moisture content of the composition to below 10% by weight, more preferably to below 7% by weight, more preferably to below 5% by weight.

Roasting will preferably be performed, e.g. in an oven, by heating the beans/nibs to 100 to 125° C., for about 60 min. Preferably, the method of the present invention will comprise a roasting step.

Extraction/Isolation

The method of the present invention results in an alkalized composition comprising a variety of chromophores, including reddish chromophores and yellowish chromophores, which are capable of imparting a distinct color to food products. Advantageously, these chromophores may be recovered or concentrated from the alkalized composition to produce a final food product. Thus, the method of the invention may further comprise the step of isolating at least one compound or group of compounds from the alkalised composition, said at least one compound or group of compounds having an absorption maximum between 505 and 515 nm, preferably about 512 nm and/or between 428 and 438 nm, preferably about 432 nm and/or about 436 nm.

The isolation of chromophores may be achieved by a variety of known separation techniques such as medium-performance liquid chromatography (MPLC), analytical high-performance liquid chromatography (HPLC), preparative HPLC, and solid extraction phase extraction (SPE). Determination of the optimum isolation and/or separation system and corresponding parameters for use in isolating a fraction or a chromophore of the food product is within the knowledge of the person skilled within the art.

The inventors have found that the formation of red chromophores and yellow chromophores has been greatly improved by the method, and have also identified the compounds giving rise to formation of the chromophores with the desired high color potency.

The potent chromophores present in the food product are preferably characterized by having an absorption maximum of between 505 and 515 nm, preferably about 512 nm; and/or between 428 and 438 nm, preferably 432 nm and/or 436 nm; as measured by a combination of MPLC and HPLC with a UV-photometer.

By combining known isolation and identification techniques such as MPLC, HPLC, mass spectroscopy (MS), nuclear magnetic resonance (NMR) it was possible to identify the potent chromophores present in food products produced according to the method of the invention. Preferably the food product comprises one or more of 6'-hydroxycatechinic acid, dehydrodicatechin, dehydrocatechinic acid-catechin dimer, preferably a compound having the general formula (I)

I wherein $R^1$ is selected from

II or

III and tautomers and stereoisomers thereof, more preferably a compound of formula (V)

V

-continued

VI wherein R1 and R2 are hydrogen and R3 and R4 together form a moiety of formula (VI), or R1 and R2 together form a moiety of formula (VI) and R3 and R4 are hydrogen; and tautomers and stereoisomers thereof.

Food Product

The food product produced according to the method of the present invention may thus be a food composition having an enhanced chromophore content (especially an enhanced content of the chromophores described above); a food extract having an enhanced chromophore content; or chromophores isolated from such a food composition or extract.

These food products can advantageously be used as a food-safe coloring agents. A coloring agent should be understood as a pigment, colorant, dye, food coloring or substance that imparts color when it is added to a food product or a beverage. The chromophores may also be used in non-food and non-beverage applications such as cosmetics, pharmaceuticals, paints and dyes. If necessary, they may mixed with one or more carriers, solvents or bulking agents to facilitate their use. The appropriate carrier, solvent or bulking agent will be apparent to the person skilled in the art depending on the desired end application.

Preferably food products, such as cocoa-based products, will have a reddishness value (a*) of 5 to 15 (target values will depend on the end use of the product and will be readily determined by the skilled person). The reddishness value refers to the well known CIE L*a*b* (CIELAB) scale, which is a color space specified by the International Commission on Illumination and is used to compare colors independently of the device on which it is measured. The a*-scale is defined as cyan=−100, neutral=0 and 100=Magenta.

The reddishness value (a*) of the food product has both been characterized in dry powder in relation to a white tile plate and in an aqueous suspension in relation to a water sample. The results surprisingly showed that the food product according to the invention has a distinct reddish and yellowish colour.

Food Composition

The food product of the present invention may be added to one or more further ingredients to produce a final food composition. Thus, the present invention also provides a food composition comprising a food product obtained according to the method of the invention and one or more additional ingredients.

The food composition may be any food composition, especially one in which colour is considered an important characteristic. For example, it may be a chocolate product (such as a chocolate bar, chocolate coating, praline, chocolate inclusion, chocolate filling, chocolate spread, or chocolate drink), a bakery product (such as a cake, patisserie, or biscuit), or a dairy product (such as a yogurt, mousse, flan, pudding, or ice-cream).

The one or more additional ingredients may be selected from one or more flavouring agents, sweeteners, thickening agents, wetting agents, stabilizing agents, sugars, emulsifiers, aromas, milk including milk powder, milk fat, condensed milk, soy milk, vanilla, whey protein concentrates, non-fat milk protein, modified cellulose or combinations thereof, vitamin or mineral food additives, cocoa butter, water, and/or chocolate liquor. The requirements for, choice of and amounts of such additional ingredients will be readily determined by a skilled person in the art depending, in particular, on the desired use of the composition.
Cocoa Preferably, the method of the invention is a method for producing a cocoa-based food product wherein the initial composition is a cocoa-based composition. Advantageously, the cocoa-based composition will be a composition comprising cocoa powder, cocoa liquor and/or cocoa cake. It may be produced from any type of cocoa bean (e.g. from any origin and previously treated or not, e.g. by fermentation, sterilization, roasting, etc). The cocoa powder may be of any type known to the skilled person. For instance, it may be a high-fat cocoa powder, with more than 12%, typically about 20-25% cocoa butter by weight, a standard cocoa butter, with 10-12% cocoa butter by weight, or a low-fat or fat-free cocoa butter, with less than 10% cocoa butter or less than 2% cocoa butter by weight, respectively. Preferably, the cocoa-based composition will be a high polyphenol cocoa extract (e.g. obtained by solvent extraction).

The cocoa-based food product obtained according to the method of the invention will have unique color properties. The chromophores produced when the initial composition is a cocoa-based composition will predominantly be red chromophores. Thus, the obtained cocoa based product will preferably be a so-called "red cocoa powder" (which may vary in colour from reddish-brown, to red, bright-red, or black).

The cocoa-based food product obtained by the method of the present invention will preferably have a reddish colour defined by the reddishness value (a*). The reddishness value of the cocoa-based food product will preferably be between 5 and 15, more preferably between 7 and 15, more preferably between 10 and 15, more preferably between 12 and 15.

By adding the cocoa-based food product produced according to the method of the present invention (whether it includes an isolation step or not) to a food (or indeed non-food) composition, it is possible to naturally adjust its colour. Thus, the present invention provides a simple way of enhancing the colour of cocoa powders and other cocoa-based products which may, in turn, be used to enhance the colour of food compositions in which they are included.

Cocoa-based food products produced according to the method of the invention may advantageously be used in amounts of 0.5 wt-% to 30 wt-% based on the total weight of the final food composition. Preferably it will be used in an amount of 1-25 wt-%, more preferably of 5-20 wt-%, more preferably of 10-15 wt-%. For example, the cocoa-based food product, preferably in the form of isolated chromophores, may be mixed with standard cocoa powders to enhance their redness.

It has surprisingly been shown that the method according to the invention results in a cocoa based product having distinct color properties and a unique presence of chromophores. In particular, an increase in the potency and number of red and yellow chromophores is observed. The inventors have indeed found that the method of the present invention allows alkalization of cocoa materials to be performed under mild processing conditions. This makes the process easier to perform, more environmentally friendly and more cost efficient. Moreover, consumer satisfaction is increased since the desired colour is achieved using less chemicals. It also provides an improved control over the coloring process.

FIGURES

The patent or application file contains at least one drawing executed in color. Copies of this patent or patent application publication with color drawing(s) will be provided by the Office upon request and payment of the necessary fee.

DETAILED DESCRIPTION OF THE INVENTION

The invention will now be described in greater detail. Each specific embodiment and variation of features applies equally to each aspect of the invention unless specifically stated otherwise.

The term initial composition should be understood broadly as any naturally occurring material such as but not limited to cocoa beans, barley grain or grapefruit, which may have been subjected to one or more extraction/processing steps such a but not limited to defatting, milling, dehydration, sieving steps to provide a raw material with an increased concentration of polyphenols, preferably flavonoids or flavonoid polymers, in comparison to the naturally occurring material. The initial composition will preferably be suitable for use in food products.

The initial composition will preferably be a cocoa-based composition, that is a composition based on cocoa beans, cocoa nibs or their derivatives, such as cocoa powder, cocoa liquor, or cocoa cake. The term cocoa powder contemplates cocoa material from any source or processed according to any methods known in the art (e.g. to improve taste, texture and/or appearance) in powder form. Preferably, the cocoa powder will have an average particle size of 2 to 100 microns, more preferably 5 to 50 microns, more preferably 5 to 20 microns.

The term food product as used herein refers to the product of the method of the invention. The term food composition refers to a composition of ingredients, including the food product, in the form in which it will be sold and/or consumed. It may include, for example, chocolate products, biscuits, cakes, dairy products and beverages, such as chocolate milk. A food product can be added to a food composition during any of the steps of making said food composition.

The term chromophore should, in the context of the invention, be understood as the compounds or groups of compounds, which are responsible for imparting color properties to the composition in which they are present.

The term potent, in the context of the invention, refers to the ability of a compound or composition to impart a relatively high reddish color dilution (rCD)-factor compared to compounds or compositions not produced according to the invention.

The term rCD-factor refers to the factor of dilution, which is needed to make the color difference between a blank (e.g. water) and the food product solution undetectable.

The term reddish value should be understood as the maximum reddish value (a*) of a food product measured on the l*a*b scale. The reddish value disclosed in the present application is measured from an aqueous suspension comprising the food product with a dilution factor up to 2048 in relation to a blank water sample unless stated otherwise.

According to the invention a food product can be produced by various approaches to obtain distinct color properties at mild processing conditions. In this context mild processing conditions means low alkali levels and/or low temperatures maintained over relatively prolonged periods of time. For the ease of understanding, different embodiments of producing a food product according to the invention are described and these different (non-limiting) approaches are described below.

The 'oxygen approach' refers to an approach wherein the aqueous mixture in step c) is heated under a substantially pure oxygen containing atmosphere.

The 'oxygen x min approach' refers to an approach, where an oxygen stream is passed into the aqueous mixture of step b). The period of time, x, the stream is passed into the mixture can in principle be in the multitude of hours. However, in order to provide a cost-efficient process, it is preferred that x is between 1 to 30 minutes, preferably 5 to 10 minutes. Generally, step c) will be performed under an oxygen containing atmosphere, preferably a pure oxygen containing atmosphere when applying the oxygen x min approach. Where step c) is performed under a nitrogen atmosphere, it has been shown that a more yellowish food product and more yellowish chromophores will be obtained.

The 'oxidizing agent approach' refers to an approach, in which an oxidizing agent is added to the aqueous mixture of step b). Generally, the heating of step c) will be performed under an oxygen containing atmosphere, preferably a pure oxygen containing atmosphere. When applying the oxidizing agent approach, in particular a hydrogen peroxide approach has been successful for controlling the color of a food product. Step c) may be performed under a nitrogen atmosphere. It has been shown that if a nitrogen atmosphere is used, a more yellowish food product and more yellowish chromophores will be obtained.

Independently of the atmosphere selected in step c), the oxidizing agent can be added in step b) both before or simultaneously with passing e.g. an oxygen stream into the aqueous mixture in step b).

For a better control and cost efficient process it is advantageous that the food product is a high polyphenol extract, for example a high polyphenol cocoa extract. A high polyphenol cocoa extract can be produced by defatting a cocoa powder and using solvent extraction (such as soxhlet extraction) to isolate a polyphenol-rich fraction.

In one particular example, 10 g of defatted cocoa powder was suspended in a mixture of methanol/water (100 ml, 70/30, v/v), treated with ultrasonic sound for 10 mins, stirred for 20 mins at ambient temperature and filtered afterwards. The residue was treated again by the same procedure. Finally, the collected extracts were evaporated and then the sample was freeze-dried.

It is within the skill of the art to determine the most appropriate way of providing an initial composition and/or high polyphenol extract of said initial composition, depending on which naturally occurring material is used.

Example 1—Reddish Color Evaluation of a Cocoa Based Food Product

A study was conducted to evaluate the reddish color properties of a cocoa based food product obtained by the present invention. The cocoa based food product obtained by the present invention was compared to a process simulating the conditions of a commercial alkalizing process and a process performed without the presence of a base.

The method simulating the conditions of a commercially used process will hereinafter after be referred to as model 1. The method of the present invention will hereinafter be referred to a model 2.

In total five different methods were used to treat high polyphenol cocoa extracts, and all the treated cocoa powders were evaluated on their reddish color properties. The method of providing each sample is described in table 1.

TABLE 1

Samples tested in Example 1

| Sample | Type | Procedure |
|---|---|---|
| 1 | Model 1 Unalkalized | An aliquot of high polyphenol cocoa extract (1 g) was dissolved in 50 ml water. The aqueous mixture was heated to for 45 min at 90 degrees. Afterwards, the mixture was immediately cooled to ambient temperature. The sample was then freeze dried. |
| 2 | Model 1 Highly alkalized | An aliquot of high polyphenol cocoa extract (1 g) was dissolved in 50 ml solution of potassium carbonate (2.7 g/100 ml). The aqueous mixture was heated to for 45 min at 90 degrees. Afterwards the mixture was immediately cooled to ambient temperature and pH adjusted to 7 with formic acid (10%). The sample was then freeze dried. |
| 3 | Model 2 Low alkalization | An aliquot of high polyphenol cocoa extract (1 g) was dissolved in a 50 ml solution of potassium hydroxide (1 g/100 ml). The solution was then heated for 2 h at 60° C. under a normal atmosphere. Afterwards, the mixture was immediately cooled to ambient temperature and pH adjusted to 7 with formic acid (10%). The sample was then freeze dried. |
| 4 | Model 2 Oxygen approach | An aliquot of high polyphenol cocoa extract (1 g) was dissolved in 50 ml solution of potassium hydroxide (1 g/100 ml). The solution was thenheated for 2 h at 60° C. under a pure oxygen atmosphere. Afterwards, the mixture was immediately cooled to ambient temperature and pH adjusted to 7 with formic acid (10%). The sample was then freeze dried. |
| 5 | Model 2 Oxygen 10 min approach | An aliquot of high polyphenol cocoa extract (1 g) was dissolved in 50 ml solution of potassium hydroxide (1 g/100 ml). Oxygen was passed into the solution for 10 minutes and afterwards it was heated for 2 hours at 60° C. Afterwards, the mixture was immediately cooled to ambient temperature and pH adjusted to 7 with formic acid (10%). The sample was then freeze dried. |

Each freeze dried sample was subjected to a rCD analysis (rCDA) in order to compare different colored solutions by their color intensity and color activity, especially relevant is the reddishness (a*) of the sample.

The rCDA was performed by diluting each sample in 30 ml water and measuring the color of the solution. This is defined as a standard solution on a HunterLab ColorflexEZ in relation to 30 ml water, which is defined as a blank. The standard solution is diluted in 1:1 steps until there is no more detectable difference to the blank solution in reddishness (a*). The last step of dilution is defined as the rCD-factor.

All characterizations of the reddish value (a*) performed in this experiment and for all other examples unless specifically stated otherwise were performed with a Hunterlab colorFlexEZ 45/0° color spectrophotometer. The mode type is reflectance, measuring angle 45/0° LAV with an area view of 31,750 mm and flash count of 1415. For standardization black glass and white tile (X: 80.87, y: 85.85, Z: 91.41) from Hunterlab were used. For color evaluation EasyMatchQC Software version 4.70 with Sensor manager v4.30 and ColorCalculator v3.37 was used.

Figure 1:
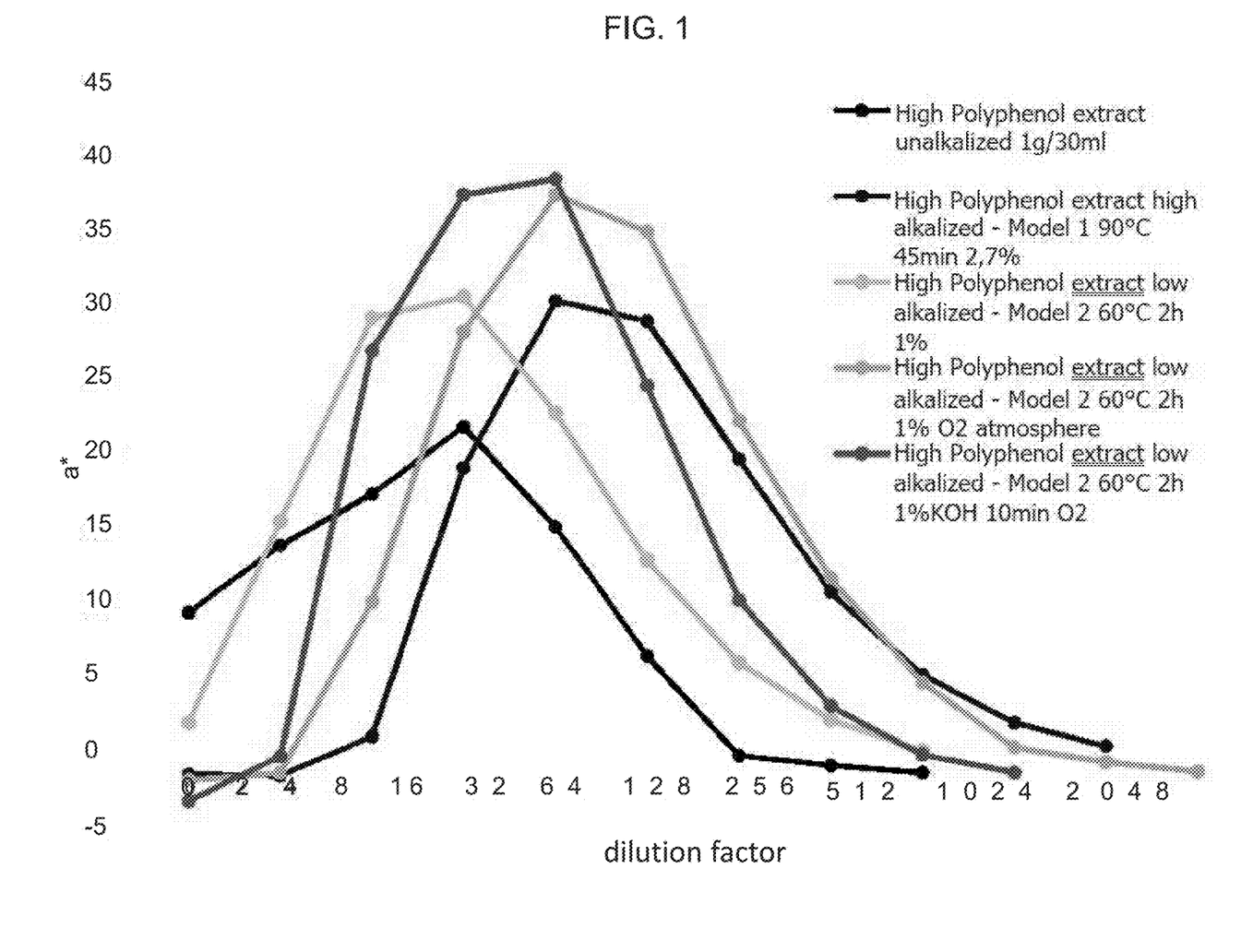
FIG. 1 illustrates a rCDA diagram of the a* value of prior art cocoa based food product and cocoa based food products obtained by the present invention as a function of the dilution factor

FIG. 1 shows a* as a function of dilution factor. From FIG. 1 it was concluded that a higher maximum value is obtained for the samples comprising a food product obtained according to the present invention. Each of the three samples had a maximum above 30 and both samples 4 and 5 showed a reddish value above 35.

Hence, with the present method is provided a cocoa based product with very distinct color properties.

Example 2—Identification of Potent Food Product Fractions

Model 1 and model 2 samples of freeze-dried cocoa based food products were pre-separated by means of MPLC. The characterization of the food products was performed on a Sepacore (Büchi) with PP cartridge column (id. 40 mm, 1.150 mm) self-packed and LiChroprep RP18, 25-40 μm mesh material (Merck). The elution was performed by a water/methanol gradient: water (pH=7.6)/methanol (100/0, v/v) 3 min isocratic, 15 min to (60/40, v/v), in 5 min to (0/100, v/v) for 5 min.

Figure 2:
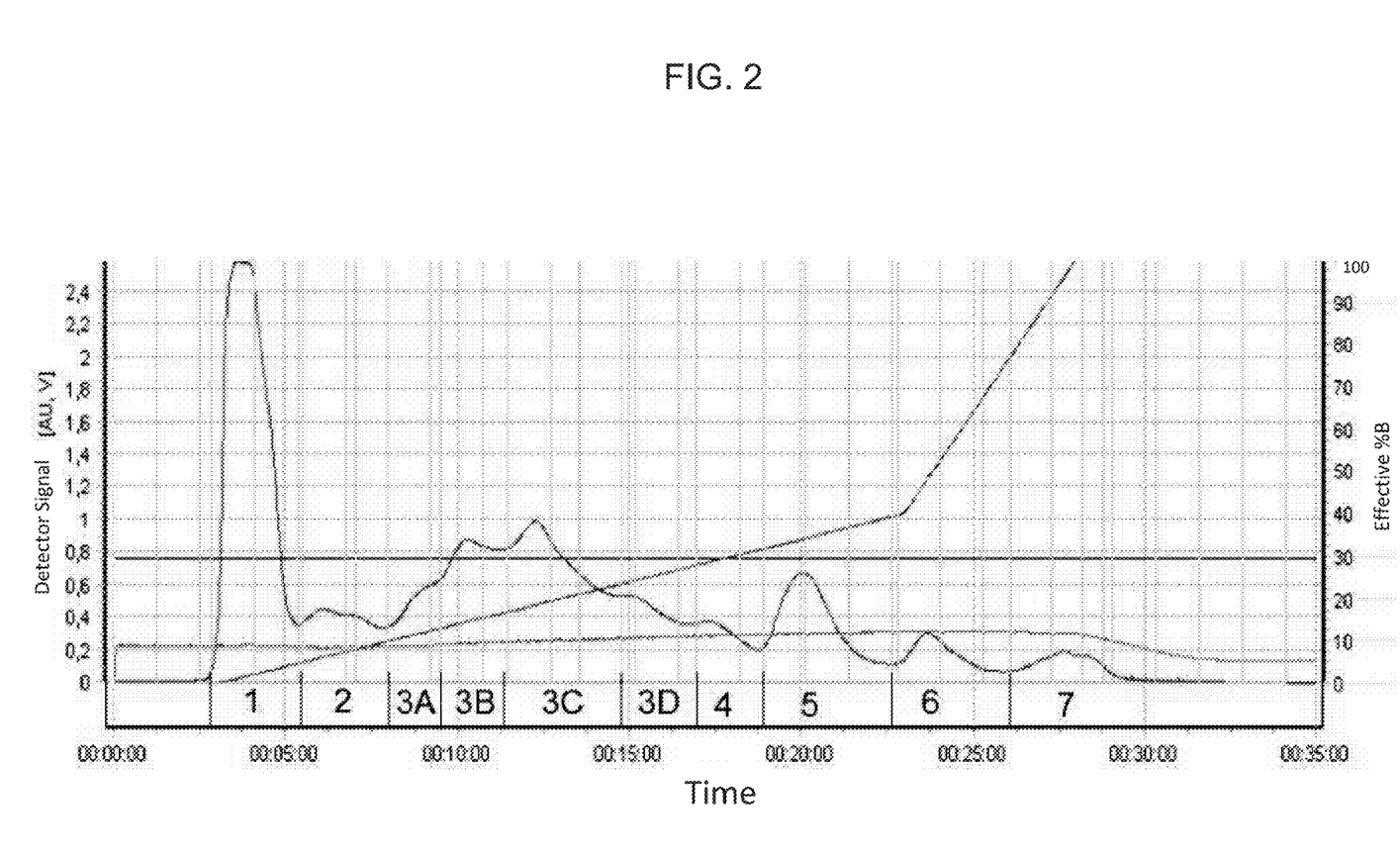
FIG. 2 illustrates a embodiment of an MPLC chromatogram of a food product according to the invention.

The pre-separation of cocoa based food products resulted in a fragmentation of the cocoa based food product into seven main fractions. The biggest fraction 3, as seen on FIG. 2, was further fragmented into four sub-fractions (3A-3D).

Figure 3:
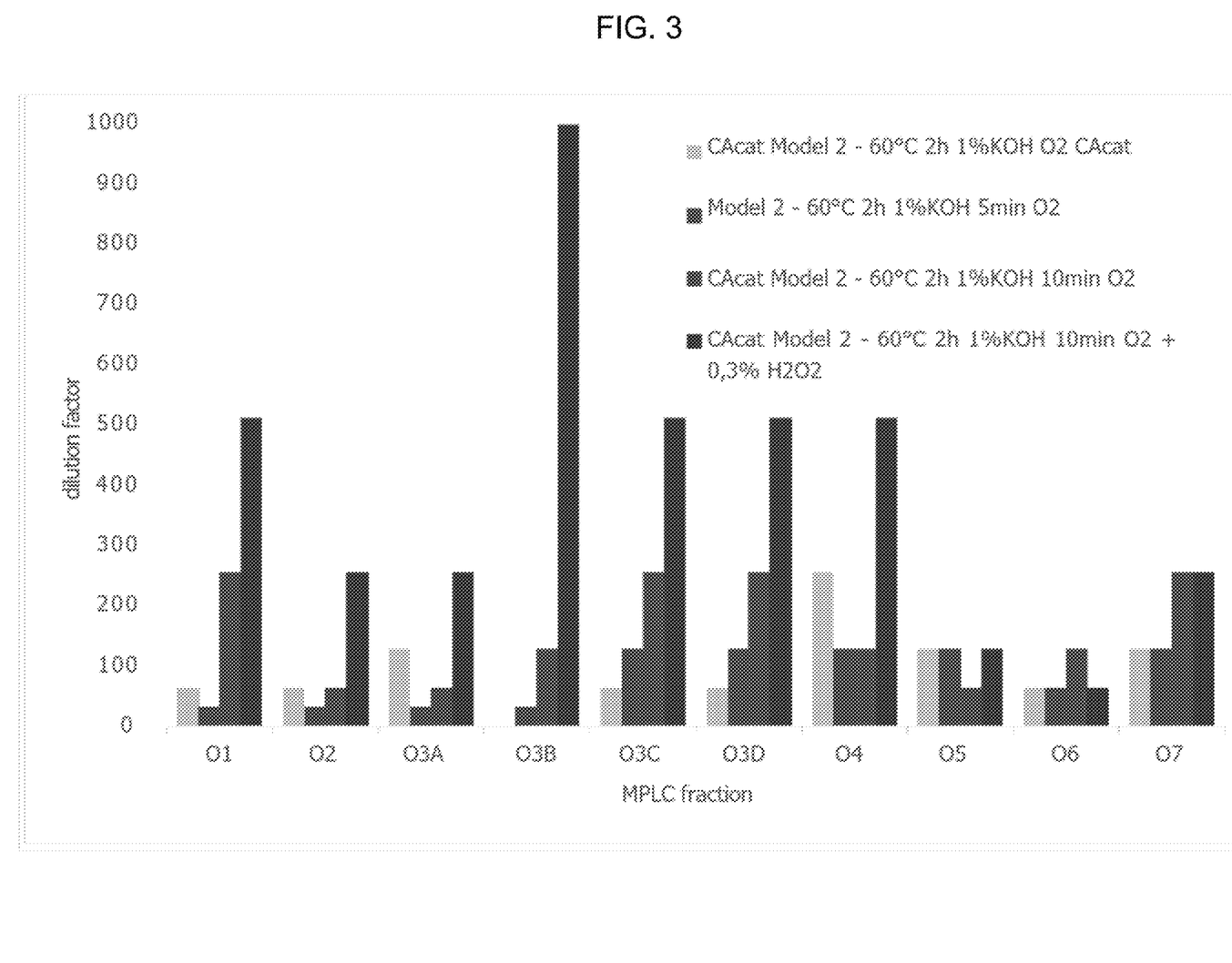
FIG. 3 illustrates a rCDA diagram of MPLC fractions wherein the rCD-factor of each fraction from various food products according to the invention is compared.

Each fraction was characterized via the described rCDA procedure and compared by their rCDA-factors. The results can be seen in FIG. 3. For model 1 samples, only fraction O1 showed remarkable rCDA-factors (not shown). In direct comparison, the most potent fractions of the food product produced by the oxygen approach and oxygen 5 min approach were O3C-5 and for the oxygen 10 min approach fractions O1, 3C, 3D and 7 were the most potent.

Additionally, for the model 2-hydrogen peroxide approach, the fraction 3B was the most potent fraction, besides fraction 1, 3C, 3D and 4.

The MPLC characterization clearly showed that the food product produced by the present invention contained more active and intensive fractions than compared to model 1.

Thus, it is possible to provide food products with colour properties, which was not previously known.

Example 3—Screening for Chromophores

Each potent fraction was further fractionated for identifying and isolating the chromophores present.

To fractionate the potent fractions of the oxygen approach of model 2, the fractions O1, O3C, O3D, O4 and O7 were further purified using high pressure RP-HPLC.

RP-HPLC analysis of the most potent fraction showed peaks with $\lambda_{max}$=488 nm for fraction O1, $\lambda_{max}$=432 nm and $\lambda_{max}$=436 nm for fraction O3C-O7 with an additional $\lambda_{max}$=512 nm for fractions 3B-O7. Hence, further investigation was conducted to determine the structure of the target compounds with the abovementioned characteristic absorption maxima A screening experiment was set up to determine the molecular formula of the compounds with $\lambda_{max}$=432 nm, $\lambda_{max}$=436 nm $\lambda_{max}$=488 nm and $\lambda_{max}$=512 nm.

For determining the molecular formula of compounds having a characteristic $\lambda_{max}$=432 nm and 436, the fractions O4-O7 were characterized by UPLC-ESI-TOF-MS measured on a Waters Synapt G2 HDMS mass spectrometer (Waters) coupled to an Acquity UPLC core system (Waters). The analysis established that the target compounds have a molecular formula of $C_{30}H_{24}O_{12}$. By comparing the mass fragment with literature data, the target compounds were determined as being dehydrodecatechins.

For determining the molecular formula of compounds having a characteristic $\lambda_{max}$=488 nm fraction O1 was characterized with UPLC-ESI-TOF-MS. Comparison with literature data, determined the compounds to be hydroxycatechinic acids with the molecular formula $C_{12}H_{11}O_7$.

For determining the molecular formula of compounds having a characteristic $\lambda_{max}$=512 nm, the MPLC fractions O3B and O7 were characterized with UPLC-TOF-MS, which determined the target compounds to have molecular formula of $C_{22}H_{15}O_8$. No prior literature data was available for the mass fragment. Thus, it is believed that the color active compounds having a characteristic $\lambda_{max}$=512 nm have not been disclosed in the prior art, and are especially not known to be present in a food product.

Example 4—Isolation and Structural Characterization of Chromophores

Structural characterization of the target compounds having a $\lambda_{max}$=488 nm in fraction O1 was performed by purifying the fraction O1 by preparative HPLC system PU-2087 Plus (Jasco) with a Phenomenex Luna 5 μm HILIC column, 250*21.2 mm, 5 μm particle size. The solvent was A: 5 mmol Ammonium formate buffer (AF, pH 5.8); B: Acetonitrile, 5 mmol ammonium formate buffer (90/10, v/v, pH 5.8). The target compounds were eluted with a gradient as follows: A/B (0/100, v/v) 15 min isocratic, in 10 min to (50/50, v/v) for 5 min.

The samples were prepared by taking an aliquot of fraction 1 (100 mg) and diluting the sample in a 5 ml mixture of water, methanol and acetonitrile (1/3/1, v/v/v), filtered through a 0.45 μm membrane (Sartorius). Afterwards, 1 ml of sample was drawn from the solution and used for preparative HILIC HPLC. The target compound with a $\lambda_{max}$=488 was eluted at 21.1 min as a reddish residue. Furthermore, a second color active compound was eluted at 35 min. The target fractions were concentrated under reduced pressure and freeze-dried, providing catechinic acid (Peak 2) as a colorless powder and hydroxycatechinic acid, in particular 6-hydroxycatechinic acid. The identification of the isolated compounds was performed by means of mass spectroscopy, 1D and 2D-NMR spectroscopy such as COSY spectroscopy, HSQC spectroscopy, HMBC spectroscopy and ROESY spectroscopy. The structure of 6-hydroxycatechinic acid follows the formula (a):

Structural characterization of the target compounds having a $\lambda_{max}=432$ nm and $\lambda_{max}=436$ was achieved using the preparative HPLC system with a Phenomenex Luna 5 μm HILIC column, 250*21.2 mm, 5 μm particle size. The solvent was A: 5 mmol Ammonium formate buffer (AF, pH 5.8); B: Acetonitrile, 5 mmol ammonium formate buffer (90/10, v/v, pH 5.8). The target compounds were eluted with a gradient as follows: Gradient 2 (HILIC): A/B (0/100, v/v) 15 min isocratic, in 10 min to (50/50, v/v) for 5 min

The sample was prepared by taking an aliquot fraction (100 mg) of O3B-O7, which is diluted in a 5 ml mixture of water, methano and acetonitrile (1/3/1, v/v/v), and filtered through a 0.45 μm membrane (Sartorius). Afterwards, 1 ml of sample was drawn from the solution and further resolved using preparative HPLC. The analysis afforded 5 peaks, wherein Peak 2 and 4 were further separated using the preparative HPLC system with a semi-preparative phenomenex Luna 5 μm Phenyl-Hexyl column, 250*10 mm, 5 μm, particle size. The solvent consisted of A: 5 mmol Ammonium formate buffer (AF, pH 5.8); B: Acetonitrile, 5 mmol ammonium formate buffer (90/10, v/v, pH 5.8). The elution was performed by a solvent gradient defined by the following procedure: A/B (95/5 v/v), in 45 min to (55/45, v/v), in 5 min to (0/100, v/v) for 4 min.

Figure 4:
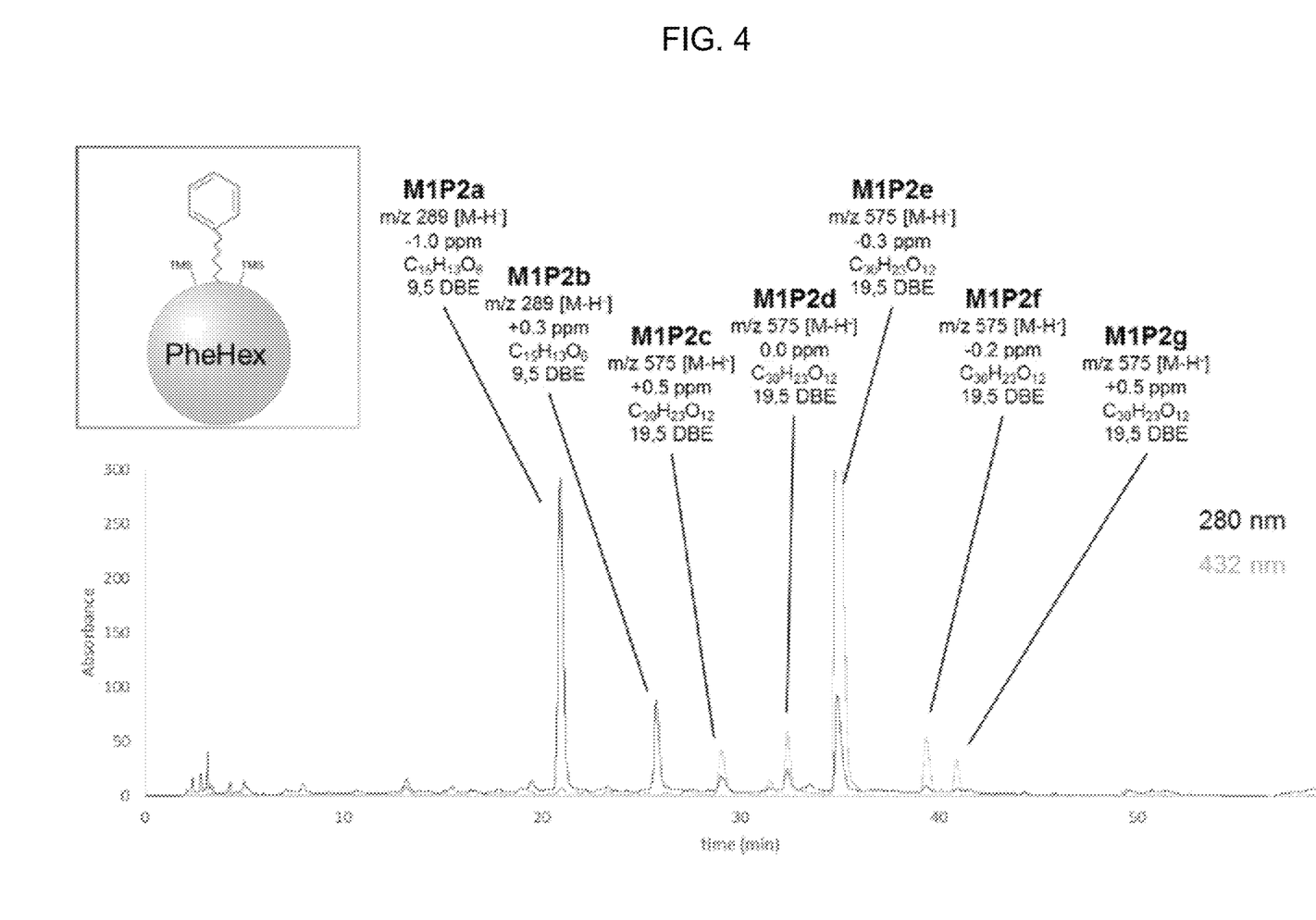
FIG. 4 illustrates a Luna phehex-HPLC chromatogram of peak 2 of fraction O1. after separating fraction O1

The peak 2 sample was prepared by taking an aliquot (10 mg) from the previous HPLC step and diluting the sample in a 1 ml mixture water and methanol (85/15, v/v). 100 ml of sample was drawn from the solution and used for chromatography. The further separation of peak 2 showed 7 peaks (P2a-g), which can be seen in FIG. 4. Collected fractions were concentrated under reduced pressure and freeze-dried. The freeze-dried fractions were identified as catechin, epicatechin as colorless powder and five different dehydrodicatechins P2c-g.

The identification of the isolated compounds was performed by means of mass spectroscopy, 1D and 2D-NMR spectroscopy such as COSY spectroscopy, HSQC spectroscopy, HMBC spectroscopy and ROESY spectroscopy, which is routine work for the skilled person. The structure of P2e was determined to be dehydrodicatechin having a general formula (I) with a $\lambda_{max}=432$.

wherein $R^1$ is

Peak 4 delivered a compound (P4b) with an $\lambda_{max}=436$ at an elution time of 12.3 min and catechinic acid (P4a) after 3.1 min. The structure of P4b was determined to be a dehydrodicatechin-like dimer having the general formula (I)

wherein $R^1$ is

Structural characterization of the target compounds having a $\lambda_{max}=512$ nm was performed by purifying the fraction O7. First, the O7 fraction was separated via Solid phase extraction step. The O7 fraction was extracted using a chromabond C18ec solid phase cartridge (45 μm, 60A, 1000 mg, 6 ml, octadecyl modified silica phase (Macherey-Nagel)).

Conditioning was done with 5 ml acetonitrile and 2*5 ml water with a baker box. The sample (50 mg) was dissolved in 10 ml water and assigned to the cartridge. The cartridge was eluted with 10*6 ml water and afterwards allowed to run dry. Subsequently, the acetonitrile fraction was eluted with 2*6 ml acetonititrile. Afterwards, the methanolic fraction was eluted with 2*6 ml methanol.

An aliquot of the methanol fraction of O7 (50 mg) was diluted in a 5 ml mixture of water and methanol (75/25, v/v) and 1 ml of this solution was used for chromatography. The sample was run by preparative HPLC system PU-2087 Plus (Jasco) with a Phenomenex Luna 5 μm phenyl-hexyl column, 250*21.2 mm, 5 μm particle size. The solvent was A: 5 mmol Ammonium formate buffer (AF, pH 5.8); B: Acetonitrile, 5 mmol ammonium formate buffer (90/10, v/v, pH 5.8). The target compounds were eluted with a gradient as follows: A/B (95/5, v/v) in 45 min to (55/45, v/v), in 5 min to (0/100, v/v) for 4 min Collected fractions were concentrated under reduced pressure and freeze-dried.

The compound having an absorption max of 512 nm was also isolated from a O3B fraction obtained by MPLC of a food product produced by the hydrogen peroxide approach according to the invention.

Figure 5:
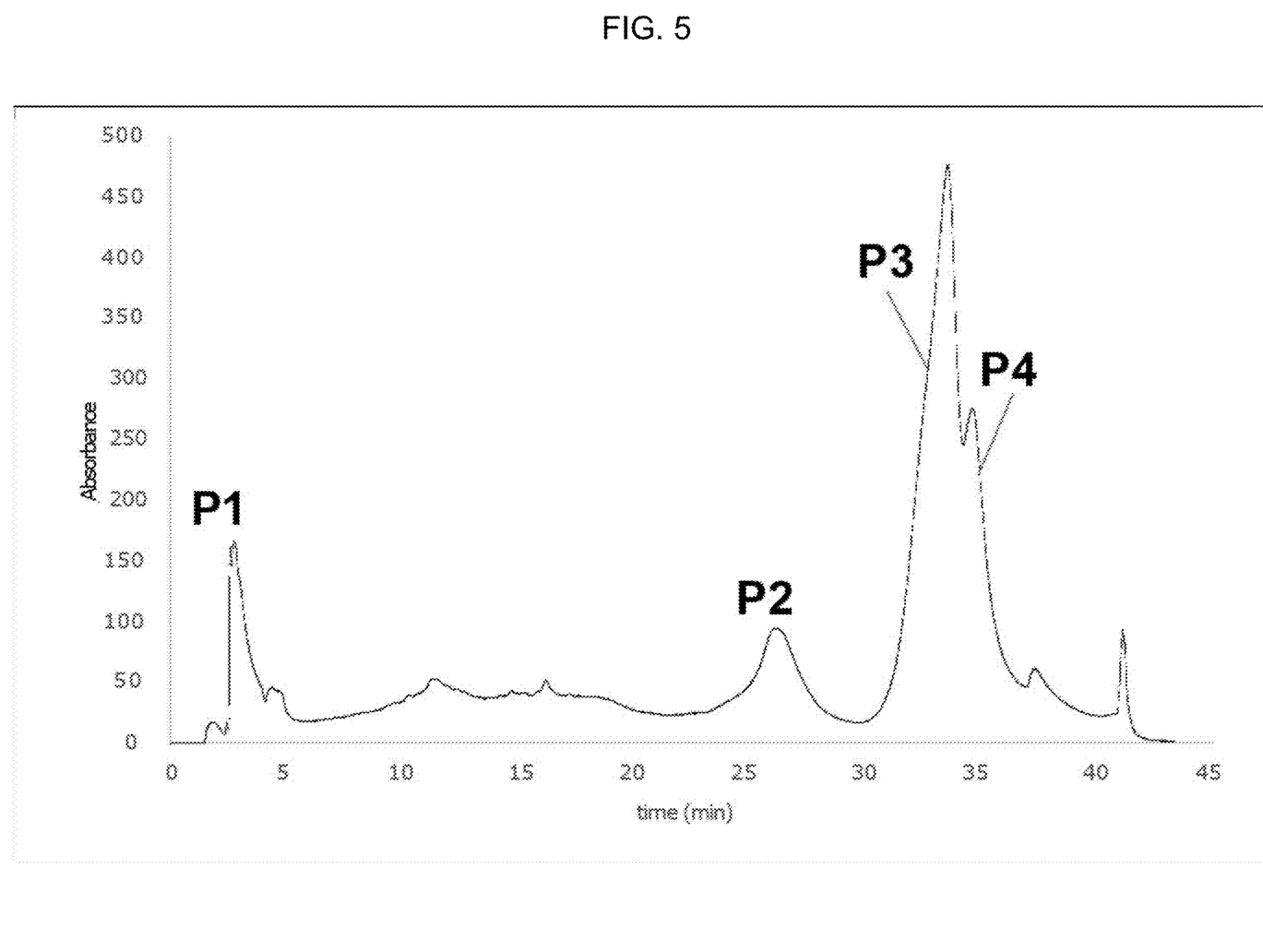
FIG. 5 illustrates a preparative HPLC chromatogram of the aqueous fraction of O3 after a pre-separation by SPE.

After SPE, the aqueous fraction of O3 was subjected to chromatography following the same parameters as for separation of O7 fractions described above. The chromatogram seen in FIG. 5 shows four different peaks, wherein only peaks 2 to 4 showed an absorption maximum of 512 nm. Hence, fractions from peak 2 to 4 were concentrated under reduced pressure and freeze-dried. The freeze-dried fractions were identified as compounds having the general formula (V)

wherein R1 and R2 are hydrogen and R3 and R4 together form a moiety of formula (VI), or R1 and R2 together form a moiety of formula (VI) and R3 and R4 are hydrogen.

The identification of the isolated compounds was performed by means of mass spectroscopy, 1D and 2D-NMR spectroscopy such as COSY spectroscopy, HSQC spectroscopy, HMBC spectroscopy and ROESY spectroscopy, which is routine work for the skilled person.

Example 5—Enhanced Composition

To improve the food product coloring a study was performed to imitate normal high red cocoa powder GT-78 (Gerkens Cocoa®) by enhancing natural cocoa powder (Amber™ from Gerkens Cocoa®) with small amounts of the food product according to the invention.

The enhancing of the natural cocoa powder was achieved by adding small amounts (125-250 mg) of cocoa based food product according to the invention to a natural cocoa powder (5 g) suspended in an aqueous solution.

After each addition, the a* value was measured until an increase of the a* was undetectable.

In total 1.38 g of cocoa based food product produced by the method according to the invention was added to 5 g of natural cocoa powder e.g. amber cocoa powder.

In this study it was possible to achieve an a*-value of 15.7 for the enhanced sample, while the normal high red cocoa powder sample achieved an a*-value of 15.3.

Hence, it is possible not only to mimic the high red cocoa powder, but also to increase the reddish color of the cocoa powder. Furthermore, the taste of the finished cocoa powder can be varied as only a portion of the final composition is derived from an alkalizing process for obtaining a desired colour effect.

The invention claimed is:

1. A method of producing a chromophore or a food product comprising a chromophore, comprising the steps of:
    a. providing an initial composition comprising a polyphenol;
    b. adding an aqueous base to the initial composition to produce an aqueous mixture comprising 0.1 wt % to 2 wt % base;
    c. heating the aqueous mixture to a temperature of 50 to 100° C. during a time period of 120 to 300 minutes;
    d. cooling the aqueous mixture; and
    e. optionally, adjusting the pH of the aqueous mixture to between 6 and 9;
    wherein the method further comprises oxygenating the aqueous base of step (b) and/or the aqueous mixture of step (c) and wherein the chromophore has an absorption maximum between 505 to 515 nm and/or 428 to 438 nm.

2. The method according to claim 1, wherein the initial composition is a composition produced from any one or more of cocoa beans, green tea, malt, peaches, grapefruit, argan kernels, acai berries, black grapes, blackberries, pomes fruit, cherries, raspberries, broad beans, prunes, and coffee beans.

3. The method according to claim 1 wherein the initial composition comprises a polyphenol rich extract from any one or more of cocoa beans, green tea, malt, peaches, grapefruit, argan kernels, acai berries, black grapes, blackberries, pomes fruit, cherries, raspberries, broad beans, prunes, and coffee beans.

4. The method according to claim 1, wherein the polyphenol is a flavonoid, or a flavonoid polymer.

5. The method according to claim 1, wherein the aqueous base of step (b) has a pH of 8 to 13.

6. The method according to claim 1, wherein the base is selected from the group consisting of alkali carbonates, alkali hydroxides, and mixtures thereof.

7. The method according to claim 1, wherein oxygenation is achieved by adding a gas flow to the aqueous base and/or aqueous mixture.

8. The method according to claim 1, wherein oxygenation is achieved by adding an oxidizing agent to the aqueous base and/or aqueous mixture.

9. The method according to claim 1, wherein the cooling of step (d) is to a temperature in the range of 15 to 30° C.

10. The method according to claim 1, wherein the chromophore comprises one or more of 6'-hydroxycatechinic acid, dehydrodicatechin, and dehydrocatechinic acid-catechin dimer.

11. The method according to claim 1, wherein the chromophore comprises a compound having the general formula (I)

I wherein R¹ is selected from

II or

III and tautomers and stereoisomers thereof.

12. The method according to claim 1, wherein the chromophore comprises a compound of formula (V)

V

VI wherein R1 and R2 are hydrogen and R3 and R4 together form a moiety of formula (VI), or R1 and R2 together form a moiety of formula (VI) and R3 and R4 are hydrogen;

and tautomers and stereoisomers thereof.

13. The method according to claim 1, wherein the produced food product has a reddishness value (a*) of 5-15.

14. The method according to claim 1, said method comprising (e) adjusting the pH of the aqueous mixture to between 6 and 9; and a further step of drying and/or roasting the product of step (e).

15. The method according to claim 1, said method comprising a further step of isolating at least one chromophore from the mixture, said at least one chromophore having an absorption maximum between 505 to 515 nm and/or 428 to 438 nm.

16. A method according to claim 1, wherein the produced chromophore or food product is mixed with one or more additional ingredients to form a final food composition.

17. The method of claim 1, wherein the aqueous mixture comprising 0.2 wt % to 1.5 wt % base.

18. The method of claim 1, wherein the oxygenation is achieved by heating the aqueous mixture in step (c) in a pure oxygen atmosphere.

19. The method of claim 1, wherein the oxygenation is achieved by passing oxygen into the aqueous mixture for 5 minutes to 30 minutes prior to heating.

* * * * *